United States Patent [19]

Stubbolo

[11] Patent Number: 4,624,300

[45] Date of Patent: Nov. 25, 1986

[54] METHOD AND APPARATUS FOR HEATING AND COOLING BUILDINGS

[75] Inventor: Louis Stubbolo, Wyoming, Del.

[73] Assignee: Aire-Wrap, Inc., Dover, Del.

[21] Appl. No.: 726,628

[22] Filed: Apr. 24, 1985

[51] Int. Cl.⁴ .............................................. F24J 3/02
[52] U.S. Cl. ....................................................... 165/45
[58] Field of Search ........................................... 165/45

[56] References Cited

U.S. PATENT DOCUMENTS

| | | | |
|---|---|---|---|
| 2,564,215 | 8/1951 | Slane | 165/45 X |
| 4,323,113 | 4/1982 | Troyer | 165/45 |
| 4,384,609 | 5/1983 | Neuzil | 165/45 |
| 4,420,036 | 12/1983 | Blaser | 165/45 |
| 4,449,572 | 5/1984 | Lambert | 165/45 X |
| 4,476,921 | 10/1984 | Stubbolo | 165/48.1 |
| 4,505,325 | 3/1985 | Bergeron, Jr. | 165/45 |
| 4,523,519 | 6/1985 | Johnson | 165/45 X |

*Primary Examiner*—Sheldon J. Richter
*Attorney, Agent, or Firm*—Mortenson & Uebler

[57] ABSTRACT

A method and apparatus are provided for heating and cooling buildings, particularly chickenhouses, wherein low grade heat is obtained from below the frost line and, by heat exchange means, the low grade heat is used to heat or cool air which is then ducted into the building. This conditioned air circulates within the building and exits through horizontal vents extending substantially continuously around the periphery of the building near the floor thereof, which vents connect the inside of the building to vertical open wall channels within the walls of the building. The wall channels are connected at the top of the walls to similar channels in the roof of the building and into which the air passes. Exhaust means connected to the roof channels allow the air to exit to the atmosphere. The system provides an energy efficient and economic means for heating in winter and cooling in summer by utilizing the low grade heat of the earth obtained from below the frost line which, in the United States, ranges from about 45° F. to 65° F., depending on latitude.

8 Claims, 11 Drawing Figures

U.S. Patent    Nov. 25, 1986    Sheet 1 of 4    4,624,300
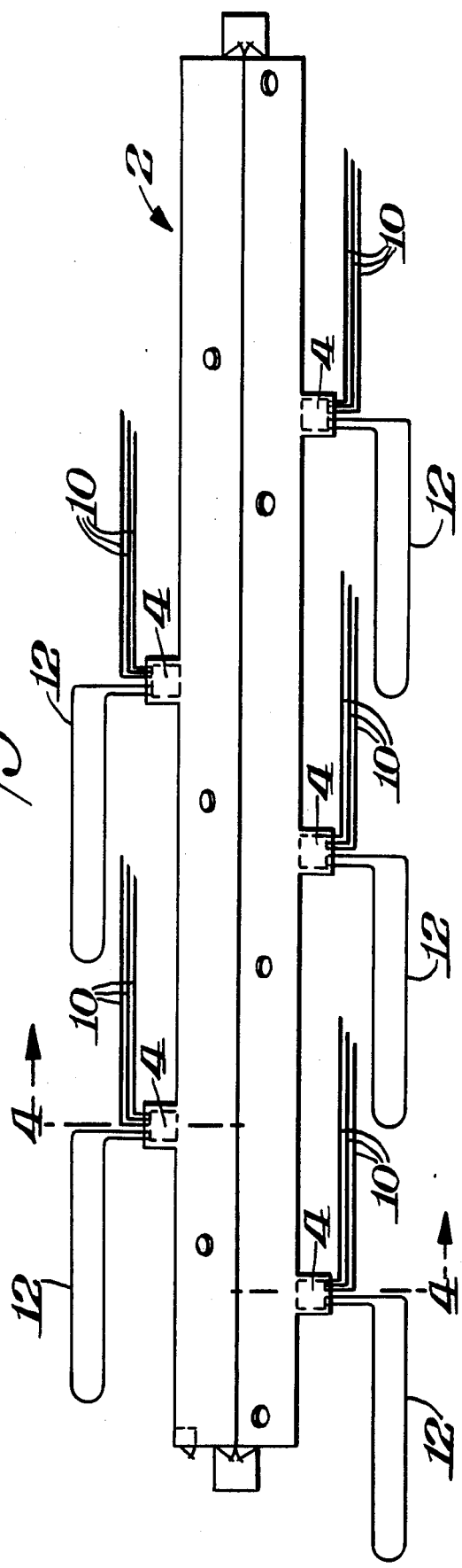
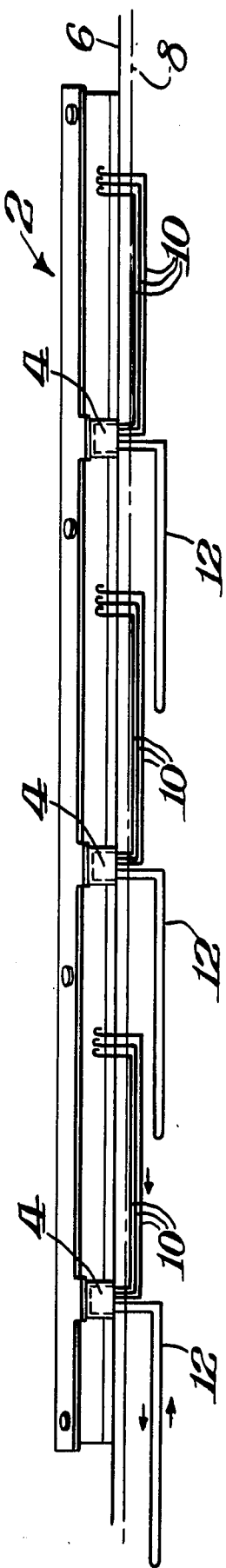
Fig. 1.
Fig. 2.

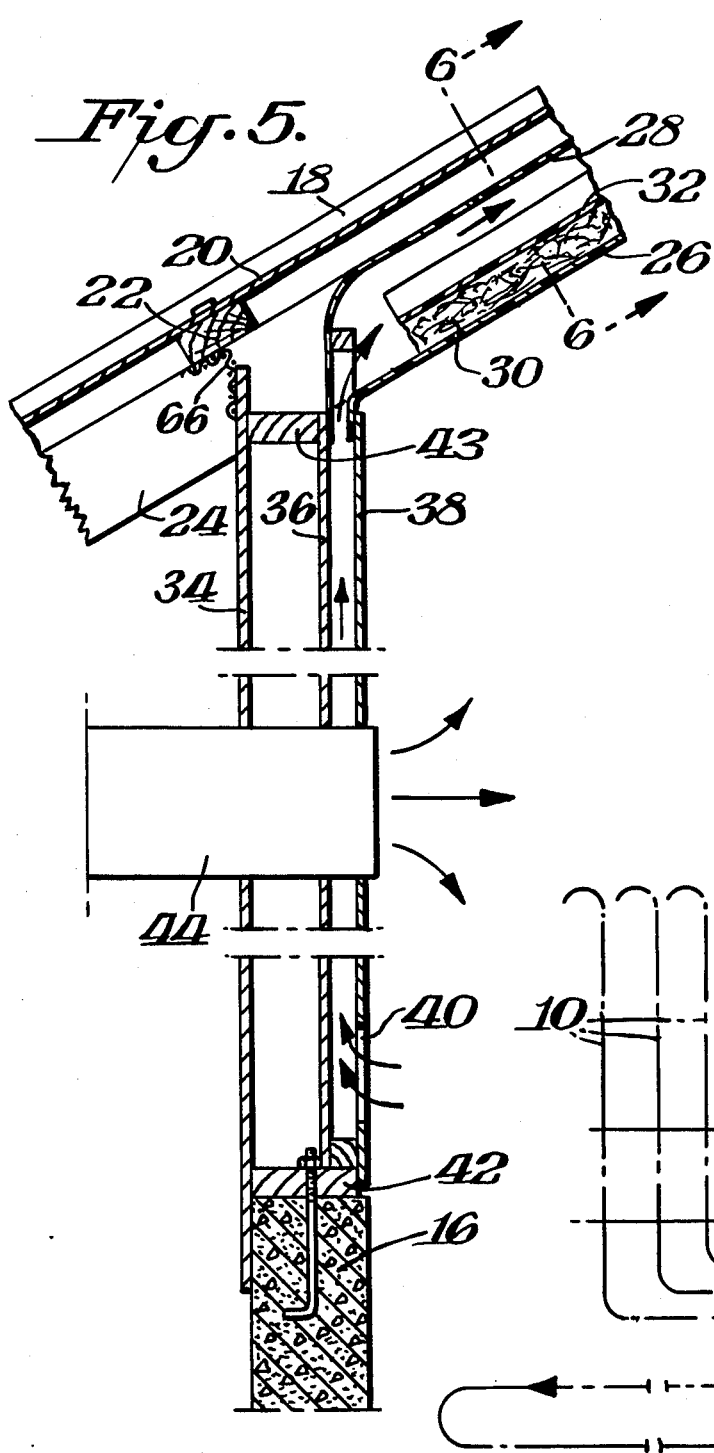
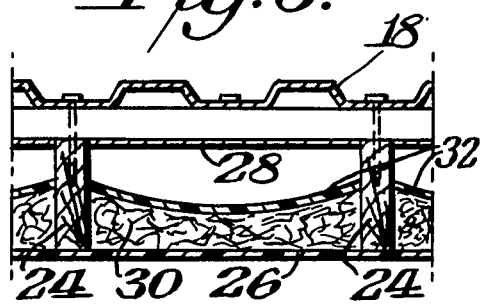
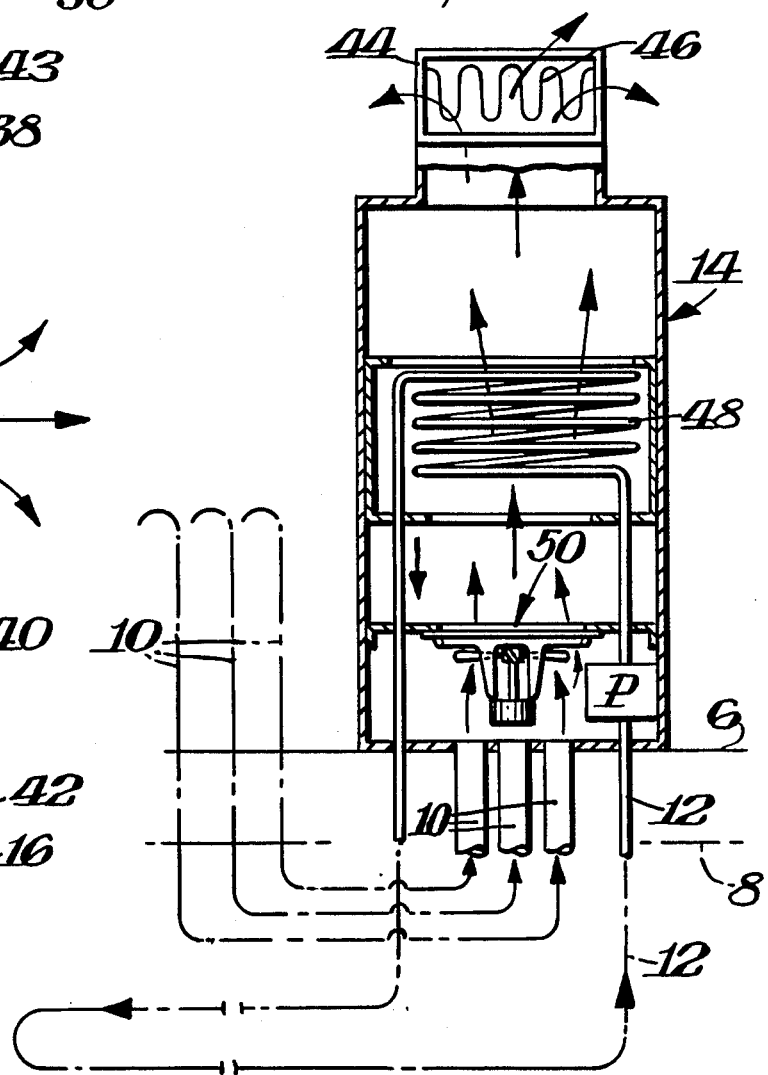

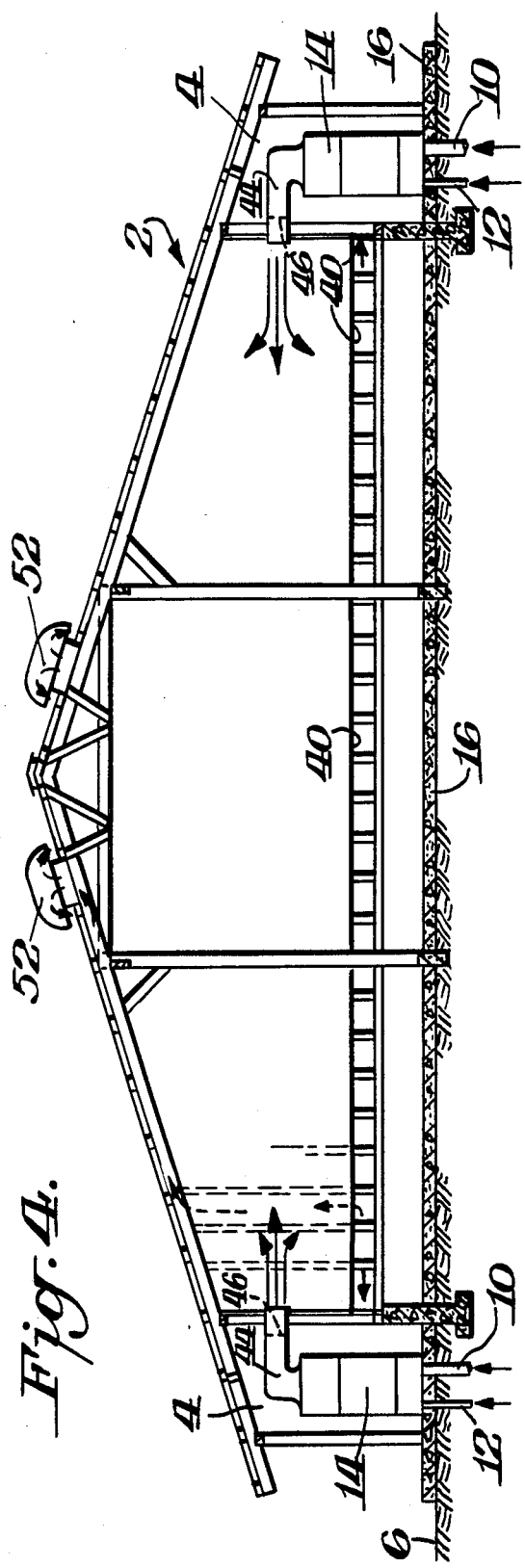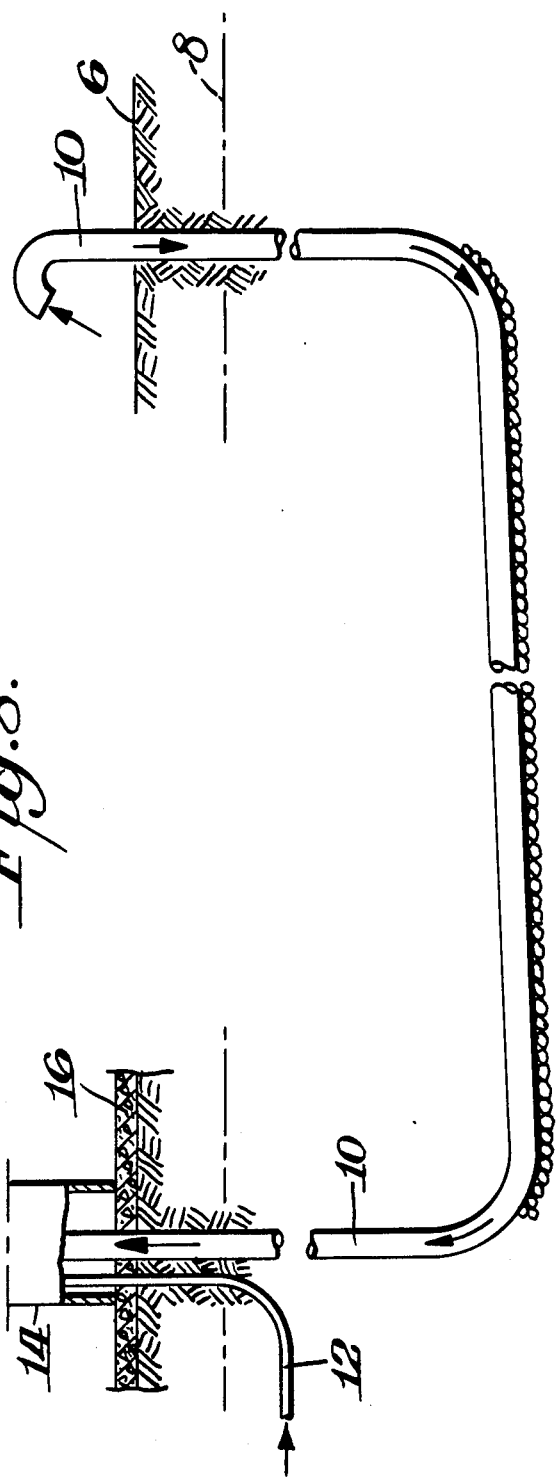

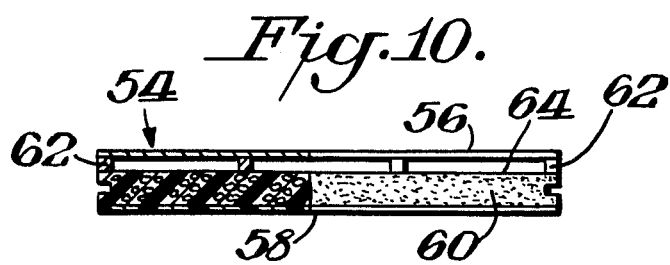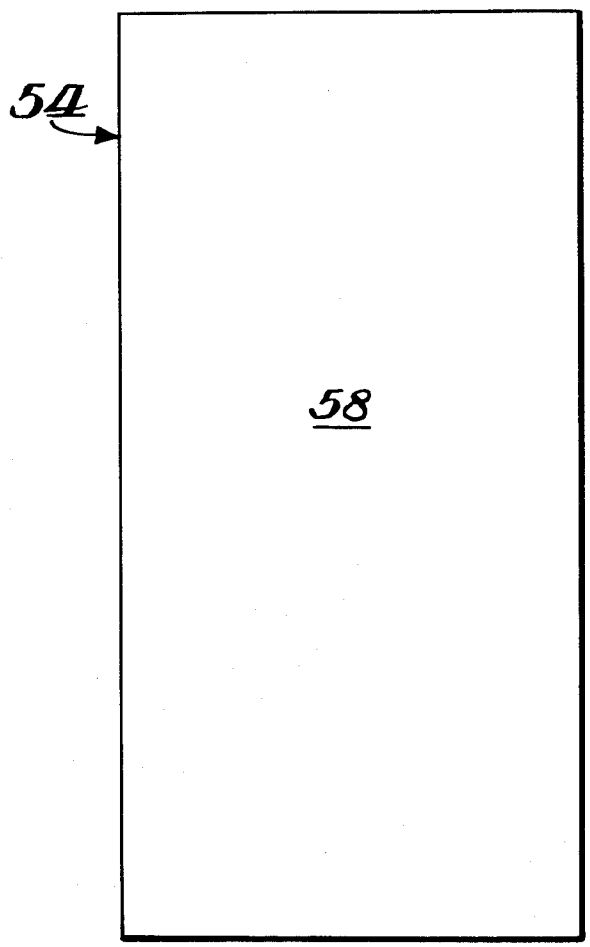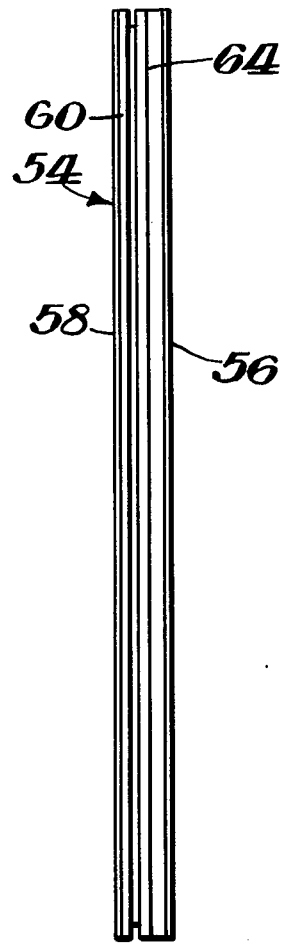

METHOD AND APPARATUS FOR HEATING AND COOLING BUILDINGS

BACKGROUND OF THE INVENTION

This invention relates to the use of low grade heat, obtained from below the frost line of the earth, to heat or cool a building.

My prior U.S. Pat. No. 4,476,921 discloses and claims a combination building structure and air circulation means comprising a foundation supporting a building having a floor, sidewalls having air channels therein, a ceiling and a roof, and means for obtaining low grade heat from air or water below the hard frost line at the location of the building, the low grade heat being in the temperature range of approximately 45°–65° F., and means for heating or cooling to the temperature range of approximately 45°–65° F. by heat exchange with the low grade heat in a first heat exchange wherein a liquid that has been circulated below the frost line to collect low grade heat is delivered to a first heat exchanger to provide a first source of heating or cooling to the air circulating within the heat exchanger, and a second heat exchange wherein low grade heat is transferred to ambient air that is circulated through a second heat exchanger and this ambient air is then delivered by conduit means to the first heat exchanger, thereby providing a second source of low grade heat to the air within the first heat exchanger, and circulating the heated or cooled air in the temperature range of approximately 45°–65° F. to the space below and adjacent the floor, the space above and adjacent the ceiling, and within the channels in the walls, thereby providing an insulating sheath of air substantially surrounding but not entering the useable space within the building.

By definition, the term "low grade heat" as used herein denotes heat obtainable from various sources but at levels below the temperature needed for human comfort, i.e. below approximately 65° F. The temperature below the hard frost line in northern regions of the United States remains substantially constant year round, at a low of approximately 45° F. in northernmost states (except Alaska) to 50°–55° F. in the middle states. In southern regions which do not freeze, the ground temperature several feet below ground level remains constant year round at approximately 65° F. The heat that is available from either air or water circulated below ground at depths which do not vary in temperature year round is ideal as the source of low grade heat to be used in accordance with the principles of this invention.

U.S. Pat. No. 4,089,142 discloses a building structure including a concrete slab which forms the building structure foundation which supports the building enclosure mounted thereon and is interposed between the building enclosure and the ground. Means are provided for thermally insulating the periphery of the slab from the ground, downwardly from the surface of the ground to at least the extent of the ground frost line and the placement of a series of edge abutting parallel rows of end-to-end abutting hollow cinder or concrete blocks, in axial alignment underlying the concrete slab and axially aligned in heat transfer relationship therewith and with the ground below the frost line. The hollow blocks form a series of parallel transverse air circulation paths and means are provided for communicating these air flow paths within the blocks to the interior of the building enclosure such that thermal radiation entering the building structure interior and impinging upon the building interior causes heat to be circulated by air flow through the parallel air flow paths within the cinder blocks and within the interior of the building blocks acting as a heat sink.

The aforesaid patent discloses heating of the concrete slab by providing glass windows on the vertical walls of the building structure on the sides facing the sun to permit direct impingement of the sun on the upper surface of the concrete slab and building structure interior to thermally heat air flowing within the building structure by convection.

U.S. Pat. No. 3,527,921 discloses a building structure provided with a peripheral foundation insulated to approximately the depth of minimal seasonal temperature variations. The floor of the building is a concrete slab and sand is provided below the slab with electric heating mats located in the sand approximately one foot below the slab to permit storing heat energy in the sand and in the ground beneath so that electric power can be used to heat the building for substantial periods of time either to take advantage of offpeak power or to minimize the effects of electrical power failures.

U.S. Pat. No. 3,965,694 discloses a system having the capability of being used as both a heating and cooling system. Therein, at least one heat pump is provided to pump heat from a heat source to the air conditioning system to prevent freezing of the system. The heat pump also removes heat from the system, when it is used as a cooling system, and diffuses it into the earth. The earth is also utilized as a source of heat to be supplied to the system.

SUMMARY OF THE INVENTION

A combination building structure and heating and cooling means therefor is provided comprising:

a water circulating system wherein water is circulated below ground and below the frost line at the site of the building to collect low grade heat in the range of about 45° F. to about 65° F., means for directing the water to and through a heat exchange coil, the water circulating in a continuous manner through the circulating system and the coil, an air circulating system, including piping having inlet and discharge ends, the inlet end positioned above ground outside the building, the piping being connected to second heat exchange means which are located below the frost line at the building site, and having means for drawing ambient air into the air circulating system through the inlet end, directing the air through the second heat exchange means to collect low grade heat and discharging the air through the discharge end over the heat exchange coil to further condition the air, the heat exchange coil and the air acting as a shell and tube type heat exchanger, the air passing the coil being directed to and through duct means which direct the conditioned air into the inside of the building wherein the air is allowed to circulate and flow to and through vents extending substantially continuously around the periphery of the building generally adjacent the floor of the building which connect the inside of the building to vertical wall channels in the walls of the building substantially around the periphery of the building, the air passing upwardly through the wall channels to roof channels in the roof structure of the building into and through which the air passes, and exhaust means connected to the roof channels through which the air exhausts to the atmosphere, the wall and roof channels providing an insulating sheath of air within the walls and the roof of the building. The combination is particularly suited for a building structure such as a chickenhouse. Additional means to heat the air can be provided such as a solar collection device, biomass degradation, or the like. Preferably the combination includes additional heating means within or adjacent the duct means which add additional heat to the air just prior to entry of the air into the building. Also provided is a method for heating and cooling a building structure.

BRIEF DESCRIPTION OF THE DRAWINGS

FIG. 1 is a side elevation of a building and the apparatus of the invention shown schematically.

FIG. 2 is a top plan view of the building and the apparatus of the invention.

FIG. 3 is an end elevation of the building.

FIG. 4 is a view taken substantially along line 4—4 of FIG. 2, partly in cross-section and partly pictorial, showing the building and apparatus of the invention.

FIG. 5 is a cross-sectional view of one side wall of the building employing the principles of the invention.

FIG. 6 is a view of the roof structure of the building taken along line 6—6 of FIG. 5.

FIG. 7 is a side elevation, partly in cross-section, of heat exchange means employing the principles of the invention.

FIG. 8 shows a preferred embodiment for obtaining ambient air, circulating it below the frost line, and directing this conditioned air to the heat exchange means shown in FIG. 7.

FIGS. 9-11 show three views of a prefabricated wall panel suitable for building walls employing the principles of the invention.

DETAILED DESCRIPTION OF THE INVENTION AND PREFERRED EMBODIMENTS WITH REFERENCE TO THE DRAWINGS

A method and apparatus are provided for heating and cooling buildings, particularly chickenhouses, wherein low grade heat is obtained from below the frost line and, by heat exchange means, the low grade heat is used to heat or cool air which is then ducted into the building. This conditioned air circulates within the building and exits through horizontal vents extending substantially continuously around the periphery of the building near the floor thereof, which vents connect the inside of the building to vertical open wall channels within the walls of the building. The wall channels are connected at the top of the walls to similar channels in the roof of the building and into which the air passes. Exhaust means connected to the roof channels allow the air to exit to the atmosphere. The system provides an energy efficient and economic means for heating in winter and cooling in summer by utilizing the low grade heat of the earth obtained from below the frost line which, in the United States, ranges from about 45° F. to 65° F., depending on latitude.

In the poultry industry, baby chicks are raised to full grown, marketable chickens in approximately 7-8 weeks time. In a typical chickenhouse, which may be 40 feet wide and 400 to up to 1000 feet long, tens of thousands of chicks may be grown in a single cycle, all of which must be fed, and all of which stir up dust, shed feathers and skin particles and leave droppings, creating high levels of airborne contamination and high levels of ammonia. When the ammonia concentration increases to unacceptably high levels, the air in the chickenhouse must be exhausted and replaced. In conventional houses, this is accomplished using huge exhaust fans which may, on a typical winter day in the mid-Atlantic states, run for 1 minute out of every 10 minutes, and in summer may run continuously. Such fans further contribute to the general chaos which exists in conventional chickenhouses.

It is known in the industry that the more contented the chicks are, the larger, and therefore more valuable, will be the resulting full grown chickens. The present invention is directed to continuously controlling the temperature within a building such as a chickenhouse and continuously removing airborne particulate contaminants and ammonia.

A detailed description of the invention and preferred embodiments is best provided with reference to the accompanying drawings wherein FIG. 1 is a side elevational view of a chickenhouse 2, typically 40 feet wide by 400 feet long. Ground level 6 is indicated and the frost line 8 below ground level 6 at the location of this building is shown. Attached to building 2 are housings 4 for heat exchange equipment to be described later in detail. Air lines 10 extend from intake openings above ground into the ground and below frost line 8 and thence into the heat exchange apparatus in housings 4. Water lines 12 extend from a coil to be described below in the heat exchange apparatus in housings 4 into the ground and below the frost line 8, forming a loop in the ground below the frost line and extending back into the heat exchange coil, forming a closed system for circulating water below the frost line 8. Other heat exchange liquids than water could be employed.

FIG. 2 is a top plan view of building 2 showing housings 4 and air lines 10 and water lines 12 located on both sides of building 2.

FIG. 3 is an end elevation of building 2 showing housings 4 with heat exchange apparatus 14 therein and exhaust means 52 located in the roof of building 2.

FIG. 4 is taken substantially along line 4—4 of FIG. 2 and shows, partly in cross-section, the building 2 resting on foundation 16 erected at ground level 6. Within housings 4 are shown heat exchange equipment into which extend water lines 12 and air lines 10 and from which air duct means 44 extend into the inside of building 2. The duct means 44 preferably contain an auxiliary heater 46 as shown. Air entering the building through duct means 34, indicated by the arrow shown, circulates in the interior of the building, passes through the vents 40 extending substantially continuously around the periphery of the building and enters the spaces within the walls of the building, to be described in detail below, passes upwardly within these spaces and into similar spaces in the roof of the building, and passes out into the atmosphere through exhaust means 52, all as indicated by the arrows shown.

FIG. 5 shows one sidewall of a building, in cross-section, showing the duct means for injecting air into the building, circulating the air in the building and thence through the peripheral vents and into the channels within the wall and roof of the building, and finally sending the air to be exhausted back to the atmosphere. The building components include the foundation 16 on which is anchored bottom wall plate 40 to which is affixed the wall comprising half-inch outside sheathing 34, outer wall 36 of the air channel, inner wall 38 of the air channel and having top plate 43. To the wall is affixed the roof having outside shield 20 being corrugated, typically, showing corrugation 18, affixed on roof cross member 20, anchored to roof rafter 24. On the inside of the roof are shown vapor barrier 26 holding batt insulation 30 and forming the roof air channel together with baffle member 28. From the outside wall 34 to the underside of the eve of the roof is installed optional poultry netting 66 between each rafter 24.

Air which enters the building through duct 44 as indicated by the 3 arrows circulates in the building and passes into the wall channel formed by outer channel wall 36 and inner channel wall 38 through duct 40 which extends horizontally around the building periphery near the floor of the building. This air passes upwardly through the wall channel and into the roof channel formed by upper member 28 and an air path guide member 32 which also serves to contain the insulation 30 and allow the air to pass thereover, all as indicated by the arrows shown. From the roof channel, the air is exhausted to the atmosphere.

FIG. 6 is a cross-sectional view taken along line 6—6 of FIG. 5. The corrugated roof 18 is shown affixed to roof rafters 24. Upper channel wall 28 and guide member 32 form the roof channel through which the air passes. Guide member 32 is preferably plastic and also serves to contain the batt insulation 30 as shown, which is held in place by vapor barrier 26.

FIG. 7, which is partly in cross-section, shows the details of the heat exchange apparatus 14 which can be used in accordance with this invention. Water flows continuously through water pipe 12, forced by means of the pump shown, the piping 12 extending below ground at level 6 and below frost line 8. Ambient air enters the inlet ends of air lines 10, the inlet ends being located above ground, the air lines 10 extending below ground level 6 and below the frost line 8. Air passes through pipes 10 and into the heat exchange apparatus 14. This air is forced over heat exchange coil 48 in the water piping 12 by the blower 50, as indicated by the arrows shown. After passage over coil 48, the air passes through duct 44 and into the building. Auxiliary heater 46, preferably thermostatted and located within duct 44, provides a final temperature adjustment to the air just prior to its entry into the building. The heating requirements needed to take onto account the heat given off by each animal when this apparatus is used in buildings housing animals, such as chickenhouses. The heat given off by each animal increases as the animals grow.

FIG. 8 shows a preferred configuration for an air line 10, which is preferably 6 inch I.D. ADS pipe. Ambient air enters the pipe intake as indicated by the arrow and passes through the pipe below ground level 6 and below frost line 8 and thence to heat exchange means 14. Water pipe 12 and foundation 16 are shown for completeness.

FIGS. 9, 10 and 11 show front elevation, top cross-section, and side elevation, respectively, of a wall panel which can be prefabricated and used in accordance with the principles of this invention. Therein, panel 54 comprises inside panel wall 56 affixed with firring strips 62 to styrofoam or similar insulation 60 which is glued to outside panel wall 58. Preferably, the styrofoam surface 64 is glued directly to the firring strip 62.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A method for heating and cooling a building structure comprising:
    (a) circulating water through a circulating system wherein water is circulated below ground and below the frost line at the site of said building to collect low grade heat in the range of about 45° F. to about 65° F.,
    (b) directing said water to and through a heat exchange coil, the water circulating in a continuous manner through said circulating system and said coil,
    (c) circulating air through a system including piping having inlet and discharge ends, said inlet end positioned above ground outside said building, said piping being connected to second heat exchange means which are located below the frost line at said building site, and having means for drawing ambient air into said air circulating system through said inlet end, directing said air through said second heat exchange means to collect low grade heat and discharging said air through said discharge end over said heat exchange coil to further condition the air, said heat exchange coil and said air acting as a shell and tube type heat exchanger,
    (d) passing said air over said coil and directing said air to and through duct means which direct said conditioned air into the inside of said building,
    (e) allowing said air to circulate and flow to and through vents extending substantially continuously around the periphery of said building generally adjacent the floor of said building which connect the inside of said building to vertical wall channels in the walls of said building substantially around the periphery of said building,
    (f) passing said air upwardly through said wall channels to roof channels in the roof structure of said building into and through which said air passes, and
    (g) exhausting said air through exhaust means connected to said roof channels through which said air exhausts to the atmosphere, the wall and roof channels providing an insulating sheath of air within the walls and the roof of the building.

2. The method of claim 1 wherein said building structure is a chicken house.

3. The method of claim 1 having additional means to heat said air comprising a solar collection device, biomass degradation, or the like.

4. The method of claim 1 including adding additional heat to said air within or adjacent said duct means just prior to entry of said air into said building.

5. A combination building structure and heating and cooling means therefor comprising:
    (a) a water circulating system wherein water is circulated below ground and below the frost line at the site of said building to collect low grade heat in the range of about 45° F. to about 65° F.,
    (b) means for directing said water to and through a heat exchange coil, the water circulating in a continuous manner through said circulating system and said coil,
    (c) an air circulating system including piping having inlet and discharge ends, said inlet end positioned above ground outside said building, said piping connected to second heat exchange means which are located below the frost line at said building site, and having means for drawing ambient air into said air circulating system through said inlet end, directing said air through said second heat exchange means to collect low grade heat and discharging said air through said discharge end over said heat exchange coil to further condition the air, said heat exchange coil and said air acting as a shell and tube type heat exchanger, said air passing said coil being directed to and through (d) duct means which direct said conditioned air into the inside of said building wherein said air is allowed to circulate and flow to and through (e) vents extending substantially continuously around the periphery of said building generally adjacent the floor of said building which connect the inside of said building to (f) vertical wall channels in the walls of said building substantially around the periphery of said building, said air passing upwardly through the wall channels to (g) roof channels in the roof structure of said building into and through which said air passes, and (h) exhaust means connected to said roof channels through which said air exhausts to the atmosphere, the wall and roof channels providing an insulating sheath of air within the walls and the roof of the building.

6. The combination of claim 5 wherein said building structure is a chicken house.

7. The combination of claim 5 having additional means to heat said air comprising a solar collection device, biomass degradation, or the like.

8. The combination of claim 5 including additional heating means within or adjacent said duct means which add additional heat to said air just prior to entry of said air into said building.

* * * * *